Patented Aug. 30, 1927.

1,640,886

UNITED STATES PATENT OFFICE.

THOMAS S. CURTIS, OF LOS ANGELES, CALIFORNIA, ASSIGNOR, BY MESNE ASSIGNMENTS, TO PACIFIC-SOUTHWEST TRUST & SAVINGS BANK, TRUSTEE, OF LOS ANGELES, CALIFORNIA, A CORPORATION OF CALIFORNIA.

NONSLIP FLOOR TILE.

No Drawing. Application filed September 5, 1925. Serial No. 54,825.

Non-slip ceramic tiles of the porcelain or so called ceramic class have been heretofore proposed, and are being rather extensively used today.

So far as I am aware, the now used non-slip tile has its non-slip or rough qualities created by the use of abrasive grains of some kind or other, as imbedded in a ceramic bond.

It has been the object of my present invention to provide a tile for the purpose above referred to but made in an entirely different way conducive to cheapness, increased efficiency and otherwise advantageous as will appear more fully hereinafter.

To set forth the broad principle of my invention, I note that I employ a tile composed of a hard body substance in which I create, by a special novel method of manufacture, a multiplicity of spots, zones or elements of varying density. Unlike those tiles wherein abrasive grains of greater hardness than the tile body are employed, the spots or elements of greater density in the tile made by me are not essentially different in hardness with respect to the portions of the hard body of lesser density. In fact the substance from which I make my tile is the same throughout its body but I produce the variation in density of the material from which the tile is made in a peculiarly novel manner.

Further describing the principle of the process of making my tiles it is noted that I produce the high density spots or zones of my tile by mixing with a certain proportion of the comminuted batch or mixture from which the tiles are molded, a greater amount of moisture than employed for the rest of the batch or mixture. That portion of the mixture which contains the greater amount of moisture will become agglomerated into small balls or pellets which of course are of greater density than the lesser moistened powder of the mixture surrounding them.

With the application of the above principle of tile formation it will be obvious that with the spots or zones comprising balls or pellets of highest density, in the tile body, the portion of the tile surrounding these pellets or balls will naturally wear away more rapidly than the very dense pellets or spots or zones. Under these conditions the dense spots or zones are continuously and progressively exposed to maintain a roughened or undulating surface for my tile.

As my tile is made throughout of the same substance there is necessarily an affinity between the particles of grains from which the tile is formed, that is not possessed by those types of tiles wherein coarse grains of special high hardness, and usually of wholly different analysis from the surrounding substance, are imbedded in the body substance or materials of the tile. Moreover with my method of manufacture, my tile can be made almost vitreous, and the non-slip efficiency thereof in no way sacrificed. The importance of this phase of my invention alone is great, because my tile with a smooth vitreous-like surface is less absorbent. and therefore can be maintained more clean than common types of floor tiles in use. These tiles are employed extensively now in the lobbies of public buildings, on the steps of subways, and in many other places. The ordinary type of ceramic tile carries with it a certain hazard to life and limb, incident to slipperiness, especially in wet weather.

In the carrying out of my invention my special novel composition for making tiles and process employed, may be set forth as follows.

A typical example of a suitable raw material from which my improved tile may be made is described as follows, but I do not wish to be limited to this particular raw material or formula since my invention has to do specially with a general composition, and process of manufacture, to produce the desired characteristic rather than with the application of any particular ceramic material. I may therefore take as example for a suitable body from which to make my improved tile, 97% cyanite, 3% magnesite. The two materials are intimately ground to a flour all of which will pass a 150 mesh screen after which the powder is placed in a suitable mixing machine, such as a paint mixer, with a sufficient percentage of water to cause approximately one-half of the powder to become agglomerated into small balls, the remainder of the powder being merely damp. The water used in this mixture must have had previously dissolved in it one-half of one per cent of gum acacia to provide dry strength in the mass.

The moistened mixture is then to be passed through a screen having openings approximately one-tenth inch in diameter, after which it is remixed to obtain uniformity or homogeneity.

The mixture may then be charged into moulds in a tile press of conventional design and after pressing the tile is dried in a drier of the usual type.

On coming from the drier the face of the tile is placed against a rotating abrasive wheel such as a pattern maker's grinder to destroy the identity of the press ram and to bring to an effective surface the difference in density occasioned by the particles of relatively moist and relatively dry batch from which the tile was made.

The tile is then ready to be placed in a ceramic kiln where it is to be fired to a temperature necessary to bring about the desired hardness for use. After firing the tile is ready for use.

With my improved tile the particles from which it is made may be sufficiently fine as to prevent the excessive absorption of dirt, or stains, which as a rule create an unsightly appearance. The foregoing is due to the fact that my tile body is practically homogeneous respecting the hardness of the substances employed for making it, notwithstanding that the tile contains the spots or zones of high or low density.

While I preferably use cyanite ($Al_2SiO_5$) in largest percentage in my tile composition I might employ any other native aluminum silicate. The crystallographic and physical characters of cyanite, however, are especially well suited for the purposes of this invention, and it is available in quantities in various localities in this country being a characteristic mineral of the metamorphic crystalline rocks—gneiss, schist, granulite and eclogite.

Having thus described my invention, what I claim as new and desire to secure by Letters Patent is:

1. A non-slip ceramic tile, comprising a body of a substance homogeneous throughout but formed with spots or zones of higher density than the body of the substance from which the tile is made.

2. A non-slip ceramic tile, comprising a baked ceramic body made from a comminuted substance of uniform hardness throughout, in which substance spots or zones of higher density than the body of the tile are produced.

3. A ceramic tile made from cyanite and magnesite, mixed in powdered form to produce a body of substantially uniform hardness throughout, in which body are located agglomerated balls forming high density spots or zones.

4. A ceramic tile composed of approximately 97% cyanite, and 3% magnesite, mixed to provide agglomerated balls or pellets uniformly distributed throughout the body thereof, said composition being baked so that the tile is formed with high density zones or spots equally distributed throughout its body and of greater density than the body portion proper.

In testimony whereof I affix my signature.

THOMAS S. CURTIS.